(12) United States Patent
Inamura

(10) Patent No.: US 6,417,838 B1
(45) Date of Patent: Jul. 9, 2002

(54) ELECTRONIC EQUIPMENT HAVING INPUT DEVICE THAT PERMITS OPERATIONS, INCLUDING POSITIONAL CONTROL IN MOVING CURSOR AND SCROLLING OF DOCUMENT ON SCREEN

(75) Inventor: Junichi Inamura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/558,085

(22) Filed: Apr. 25, 2000

(30) Foreign Application Priority Data

Apr. 26, 1999 (JP) .......................................... 11-118224

(51) Int. Cl.[7] .............................. G06G 5/00; G06G 5/08
(52) U.S. Cl. ........................ 345/157; 345/160; 345/169
(58) Field of Search ................................. 345/156, 157, 345/159, 160, 161, 167, 169; 361/680, 681

(56) References Cited

U.S. PATENT DOCUMENTS

| 5,012,230 | A | * | 4/1991 | Yasuda | 345/160 |
| 5,086,296 | A | * | 2/1992 | Clark | 345/160 |
| 5,252,952 | A | * | 10/1993 | Frank et al. | 345/157 |
| 5,421,213 | A |  | 6/1995 | Okada |  |
| 5,504,502 | A | * | 4/1996 | Arita et al. | 345/160 |
| 5,572,237 | A | * | 11/1996 | Crooks et al. | 345/156 |
| 6,031,518 | A | * | 2/2000 | Adams et al. | 345/156 |
| 6,144,368 | A | * | 11/2000 | Ooka et al. | 345/161 |
| 6,184,865 | B1 | * | 2/2001 | Zimmerman et al. | 345/160 |
| 6,313,849 | B1 | * | 11/2001 | Takase et al. | 345/684 |
| 6,326,948 | B1 | * | 12/2001 | Kobachi et al. | 345/157 |

* cited by examiner

Primary Examiner—Bipin Shalwala
Assistant Examiner—David L. Lewis
(74) Attorney, Agent, or Firm—Brinks Hofer Gilson & Lione

(57) ABSTRACT

Electronic equipment features outstanding crispness of operation and responsiveness, and features great ease of operation. The electronic equipment includes an input device having a pair of operating members exposed on an inner surface and an outer surface, respectively, of a cover member. Each of the pair of operating members can be independently moved within a predetermined range in a surface direction of the cover member. A moving direction and a moving amount of each of the paired operating members are detected by a detecting section (not shown), and a moving direction and a moving amount of at least a cursor, which is an operation object displayed on an image display section, are controlled based on the detected moving direction and moving amount.

5 Claims, 4 Drawing Sheets

ELECTRONIC EQUIPMENT HAVING INPUT DEVICE THAT PERMITS OPERATIONS, INCLUDING POSITIONAL CONTROL IN MOVING CURSOR AND SCROLLING OF DOCUMENT ON SCREEN

BACKGROUND OF THE INVENTION

1. Field of the Invention

The present invention relates to electronic equipment and, more particularly, to electronic equipment provided with an input device that permits operations, such as positional control in moving a cursor and scrolling a document on a screen.

2. Description of the Related Art

Relatively small electronic equipment, such as a notebook personal computer, in which an input device for moving a cursor or the like displayed on an image display section of a display unit or the like is integral with a main unit, has been extensively marketed.

In the notebook personal computer or the like, an input device comprised of a plane pad or the like is installed in the vicinity of a keyboard input device. An operator slides his or her finger on a surface of the pad to move a pointer on an image display section so as to control a moving direction or a moving amount of the cursor or the like.

Other input devices include a stick, which is provided upright in a gap among a plurality of key switches. The stick detects a distortion caused by a load applied to the stick to thereby control the moving direction and the moving amount of the cursor or the like.

By operating the plane pad or the stick or the like, the pointer on the image display unit is positioned at a scroll bar, which is located at a corner of the image display section and provides a scroll function, then a document displayed on the image display section is freely scrolled vertically or horizontally by clicking.

In the case of the plane pad type input device, however, the pad itself remains stationary, and the operator simply slides his or her finger on the surface of the pad. Hence, the operator cannot feel an operating load, making this type of input device not very satisfactory in terms of crispness or responsiveness.

In the case of the stick type input device, since it is provided upright in the gap among the plural key switches, keyboard switches surrounding the stick interfere with the stick, preventing the stick from being sufficiently inclined. Therefore, a slight distortion caused by a small tilt of the stick is detected to control the movement of the cursor or the like.

Thus, the input devices employed with the conventional electronic equipment have been unsatisfactory for users in the aspects of operational crispness or responsiveness, and ease of operation thereof has been in need of improvement.

More specifically, to scroll a document displayed on the image display section up or down or to the right or left, the pointer must be moved all the way to the scroll bar, which provides the scroll function, located at the corner on the image display section. This makes the operability of the scroll function unsatisfactory.

SUMMARY OF THE INVENTION

In view of the foregoing, it is an object of the present invention to provide electronic equipment that features satisfactory operational crispness and responsiveness to an operator, and great ease of operation.

To this end, according to the present invention, there is provided electronic equipment having: a cabinet in which a keyboard input device comprised of a plurality of key switches is installed; a cover member attached to the cabinet and which is capable of opening and closing a top of the cabinet; an image display section provided on an inner surface of the cover member facing against the keyboard input device when the cover member closes the top of the cabinet; and an input device provided on the cover member in the vicinity of the image display section, wherein the input device has a pair of operating members exposed on an inner surface and an outer surface, respectively, of the cover member, each of the pair of operating members can be independently moved within a predetermined range in a surface direction of the cover member, a moving direction and a moving amount of each of the operating members are detected, and a moving direction and a moving amount of an operation object displayed on the image display section are controlled based on the detected moving direction and the moving amount of each of the operating members.

In a preferred form of the present invention, the input device has a movable electrode provided on each of the pair of operating members, and a fixed electrode provided at a position opposing the movable electrode, wherein either the movable electrode or the fixed electrode is divided into a plurality of electrodes to form individual electrodes so as to form a plurality of capacitors between the individual electrodes and the movable electrode, thereby providing a detecting section for detecting a moving direction and a moving amount of each of the pair of operating members based on changes in capacitances of the plural capacitors caused by a movement of each of the pair of operating members.

In another preferred form of the present invention, the fixed electrodes are formed on both surfaces of a fixed member held between the pair of operating members, and each of the fixed electrode is divided into a plurality of electrodes to form the individual electrodes.

In yet another preferred form of the present invention, the pair of operating members are configured so that a movement of at least a cursor, which is an operation object displayed on the image display section, is controlled by operating one of the pair of operating members, and a scroll function for scrolling at least a document, which is the operation object displayed on the image display section, is controlled by operating the other of the pair of operating members.

In a further preferred form of the present invention, the pair of operating members is configured so that it is supported in an initial position by a reset spring in a non-operation mode, and automatically reset to the initial position after completion of an operation.

BRIEF DESCRIPTION OF THE DRAWINGS

FIG. 4 provides schematic diagrams illustrating an exemplary movable electrode and an exemplary fixed electrode related to the present invention, wherein

FIG. 7 provides schematic diagrams showing positional relationships when the movable electrode related to the present invention is moved, wherein

DESCRIPTION OF THE PREFERRED EMBODIMENTS

Figure 1:
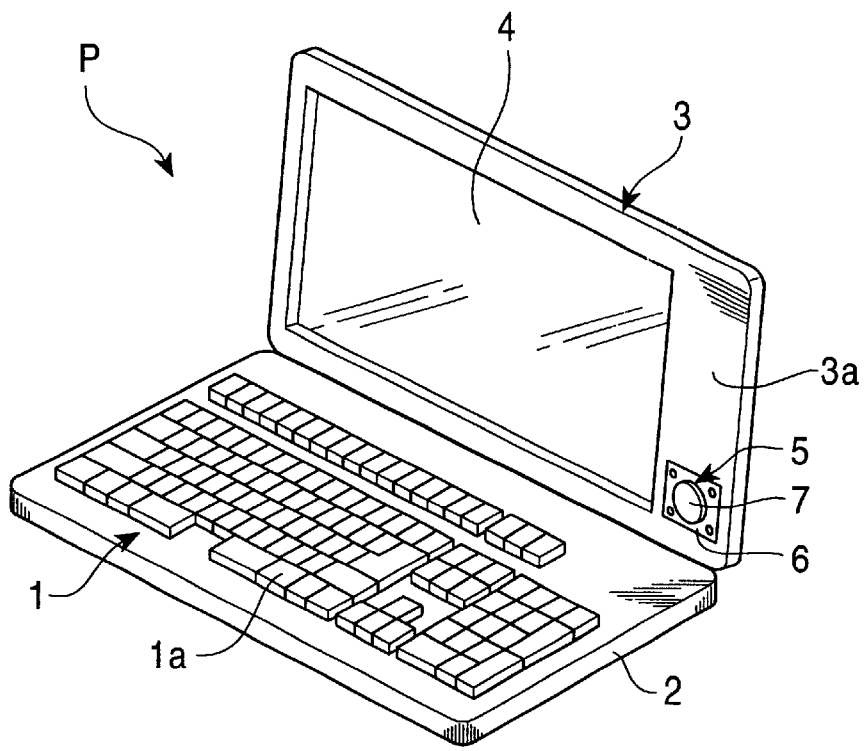
FIG. 1 is a perspective view showing electronic equipment in accordance with the present invention.
Figure 2:
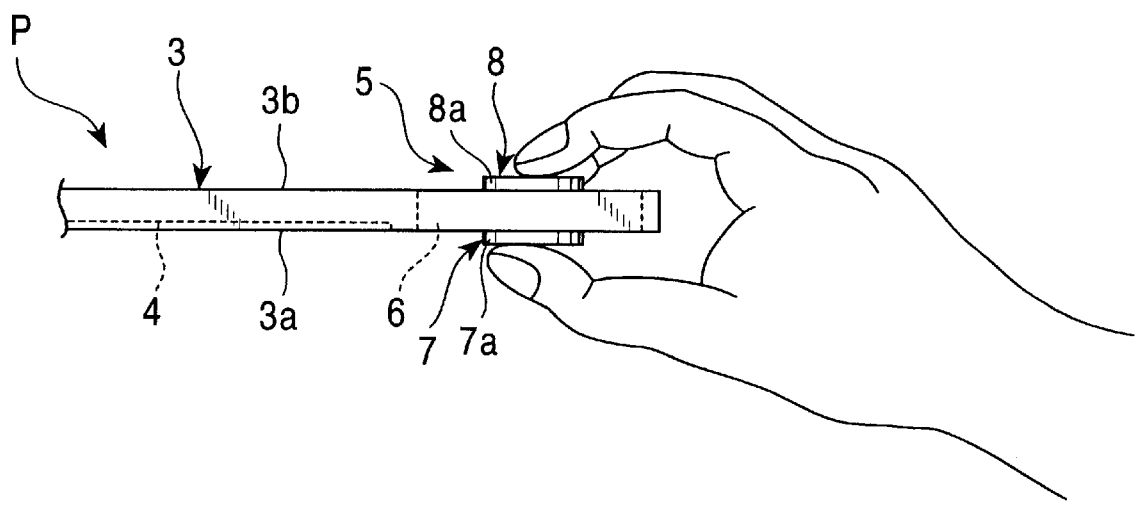
FIG. 2 is a schematic diagram illustrating an operation of an input device related to the present invention.
Figure 3:
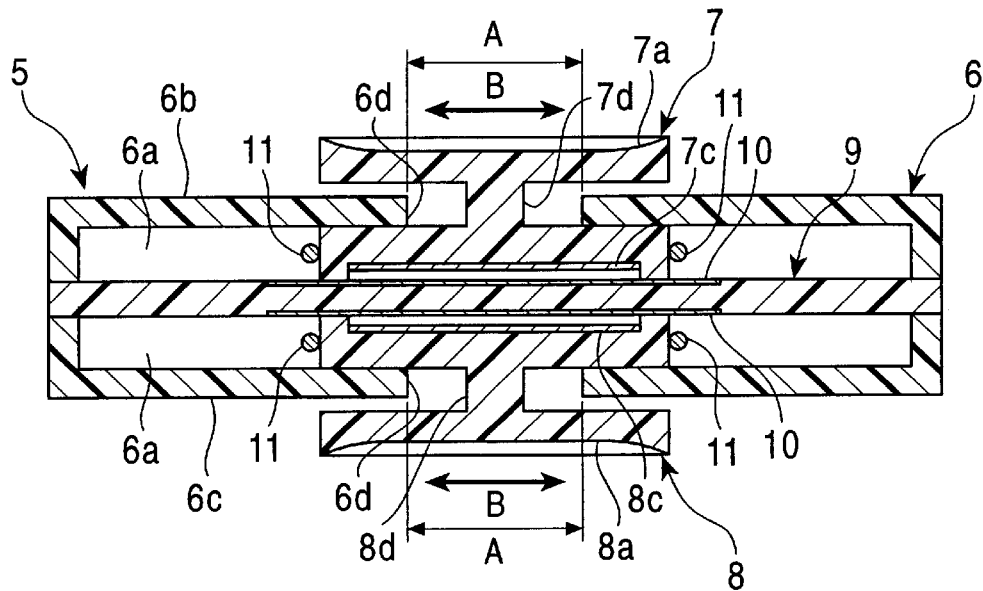
FIG. 3 is a sectional view of an essential section of the input device related to the present invention.
Figure 4A:
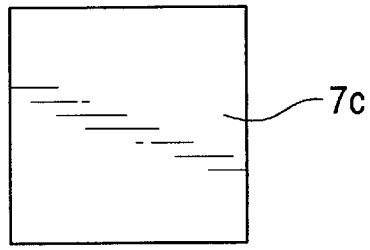
FIG. 4A is a schematic diagram of the movable electrode and FIG. 4B is a schematic diagram of the fixed electrode.
Figure 4B:
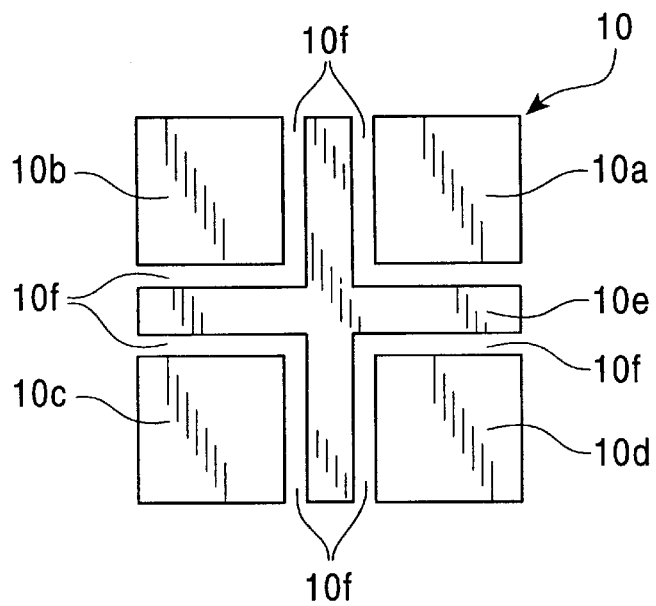
Figure 5:
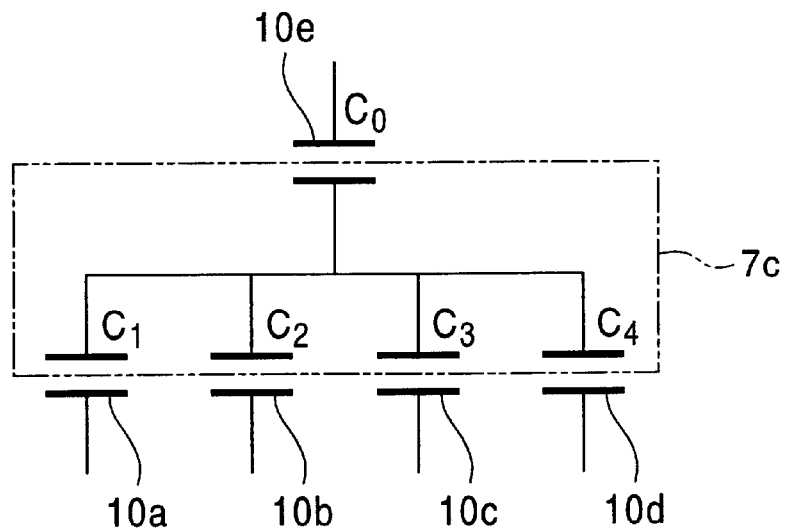
FIG. 5 is a diagram showing capacitors formed by the electrodes of FIG. 4 in the form of an equivalent circuit.
Figure 6:
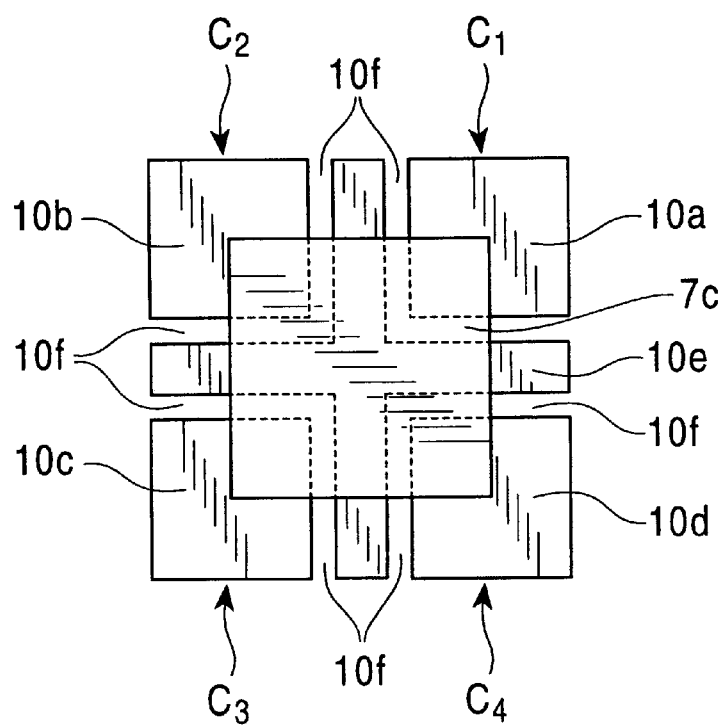
FIG. 6 is a diagram showing a positional relationship of electrodes related to the present invention.

An embodiment of electronic equipment in accordance with the present invention will now be described in conjunction with the accompanying drawings. FIG. 1 is a perspective view showing electronic equipment in accordance with the present invention; FIG. 2 is a schematic diagram illustrating an operation of an input device related to the present invention; FIG. 3 is a sectional view of an essential section of the input device related to the present invention; FIG. 4 provides schematic diagrams illustrating exemplary electrodes related to the present invention; FIG. 5 is a diagram showing capacitors formed by the electrodes of FIG. 4 in the form of an equivalent circuit; FIG. 6 is a diagram showing a positional relationship of electrodes when an operating member is in an initial position; and FIG. 7 provides schematic diagrams showing positional relationships between the fixed electrode and the movable electrode that are observed when the movable electrode is moved.

First, the electronic equipment in accordance with the present invention will be described in the form of, for example, a portable personal computer. Referring to FIG. 1, a portable personal computer P has a cabinet 2 in which a keyboard input device 1 composed of a plurality of key switches 1a is installed, a central processing unit (CPU), etc. being incorporated in the cabinet 2.

A cover member 3 mounted on an edge of the cabinet 2 is able to open and close a top of the cabinet 2. The cover member 3 has an inner surface 3a that opposes the keyboard input device 1 and covers the top of the keyboard input device 1 when the cover member 3 closes the top of the cabinet 2, and an outer surface 3b, which opposes the inner surface 3a, on an outer side thereof. The cover member 3 is shaped like a plate.

The inner surface 3a has an image display section 4 formed of a liquid crystal display unit or the like, and an input device 5 is provided in the vicinity of the image display section 4 on the cover member 3.

In the input device 5, a pair of first and second operating members 7 and 8 is installed in a box-shaped case 6 as shown in FIG. 3 such that the operating members 7 and 8 can be independently moved in a surface direction of the cover member 3 within a predetermined range.

In the personal computer P, which is the electronic equipment in accordance with the present invention, the box-shaped case 6 is installed on the cover member 3 in the vicinity of the image display section 4 such that the paired first and second operating members 7 and 8 of the input device 5 are exposed on the inner surface 3a and the outer surface 3b, respectively, of the cover member 3.

Referring to FIG. 3, the case 6 is formed to be rectangular as viewed from above, and has a plate-like fixed member 9 formed of a printed circuit board that vertically partitions a cavity portion 6a of the case 6 into two cavities. The first and second operating members 7 and 8 are positioned on both top and bottom surfaces of the fixed member 9 in the vicinity of a central portion thereof in a surface direction. Hence, the fixed member 9 is sandwiched between the first and second operating members 7 and 8.

Furthermore, a first side wall 6b and a second side wall 6c are formed at top and bottom, respectively, of the case 6 to shield the internal cavity portion 6a. The first and second side walls 6b and 6c are provided with substantially circular openings 6d and 6d having a dimension A that are located at central portions thereof in the surface direction.

The pair of first and second operating members 7 and 8 is inserted in the openings 6d and 6d, respectively. The first and second operating members 7 and 8 can move at least in directions B indicated by arrows within a predetermined range in the openings 6d and 6d having the dimension A in the surface direction of the cover member 3.

The first and second operating members 7 and 8 are formed like two discs having their central portions connected with each other by rod-shaped coupling portions 7d and 8d. As shown in FIG. 2, the first and second discs 7a and 8a are exposed through the inner surface 3a and the outer surface 3b, respectively, of the cover member 3 so that the first and second discs 7a and 8a can be moved in the surface direction of the cover member 3 by at least a thumb and a forefinger of an operator.

The first and second operating members 7 and 8 are formed so that electrode portions 7b and 8b positioned in the cavity portion 6a of the case 6 oppose both top and bottom surfaces of the fixed member 9. The electrode portions 7b and 8b that oppose the fixed member 9 are provided with movable electrodes 7c and 8c, respectively.

Furthermore, fixed electrodes 10 are formed on both top and bottom surfaces of the fixed member 9 sandwiched by the movable electrodes 7c and 8c.

A plurality of reset springs 11 composed of linear springs are elastically installed around outer peripheries of the electrode portions 7b and 8b of the first and second operating members 7 and 8, respectively. The plural reset springs 11 set the first and second operating members 7 and 8 at initial positions at the central portion of the opening 6d, and also set the movable electrodes 7c and 8c at central portions of the fixed electrodes 10.

In other words, the first and second operating members 7 and 8 are supported at their initial positions by the reset springs 11 when not in operation, and are automatically reset to the initial positions after completion of operation.

In the input device 5, each of the paired first and second operating members 7 and 8 can be independently moved, and the first and second operating members 7 and 8 share the same configuration and principle. Hence, descriptions will be given only of the first operating member 7, and the descriptions of the second operating member 8 will be omitted.

First, the movable electrode 7c of the first operating member 7 and the fixed electrode 10 of the fixed member 9 will be described in conjunction with the schematic diagrams shown in FIGS. 4A and 4B. The movable electrode 7c is formed to have a substantially square shape. The fixed electrode 10 is composed of four individual electrodes 10a, 10b, 10c, and 10d having substantially square shapes and equal areas, and a cross-shaped common electrode 10e provided to equidistantly separate the four individual electrodes.

Insulating portions 10f are formed between the individual electrodes 10a, 10b, 10c and 10d, and the common electrode 10e so as to electrically insulating the four individual electrodes 10a, 10b, 10c and 10d, and the common electrode 10e.

The five electrodes consisting of the four individual electrodes 10a, 10b, 10c and 10d, and the one common electrode 10e are arranged to oppose the movable electrode 7c with an air gap of a predetermined dimension, thus forming five capacitors.

FIG. 5 shows a configuration of the five capacitors in the form of an equivalent circuit. A portion enclosed by a two-dot chain line indicates a movable electrode 7c. The movable electrode 7c and the five electrodes making up the fixed electrode 10 form five capacitors $C_1$, $C_2$, $C_3$, $C_4$, and $C_c$.

The capacitors $C_1$, $C_2$, $C_3$, $C_4$, and $C_c$ are variable capacitors in which their capacitances vary, depending on a resistance area ratio at which the movable electrode 7c opposes the individual electrodes 10a, 10b, 10c, and 10d when the first operating member 7 is moved.

The capacitance of the capacitor $C_c$ formed by the common electrode 10e and the movable electrode 7c theoretically remains unchanged because an opposing area formed by the common electrode 10e and the movable electrode 7c remains unchanged even when the movable electrode 7c moves. In actual use, however, the capacitance of the capacitor $C_c$ slightly changes due to a stray capacity produced between the movable electrode 7c and the individual electrodes.

The personal computer P, which is the electronic equipment in accordance with the present invention, is adapted to detect a moving direction and a moving amount of the first operating member 7, and to control a moving direction and a moving amount of at least a cursor, which is an operation object displayed on the image display section 4 of the personal computer P, based on the moving direction and the moving amount.

The electronic equipment in accordance with the present invention further has a detecting section (not shown) that detects the moving direction and the moving amount of the first operating member 7 based on changes in the capacitances of the capacitors $C_1$, $C_2$, $C_3$, and $C_4$ that are formed by the movable electrode 7c and the individual electrodes 10a, 10b, 10c, and 10d of the fixed electrode 10, the changes being caused by the movement of the first operating member 7.

FIG. 6 is a schematic diagram illustrating a relationship between the movable electrode 7c and the fixed electrode 10 when the first operating member 7 is in its initial position in a non-operation mode before the first operating member 7 is moved.

When the first operating member 7 is in the non-operation mode, the first operating member 7 is set at its initial position by the action of the plural reset springs 11 as shown in FIG. 3, and the areas wherein the individual electrodes 10a, 10b, 10c and 10d oppose the movable electrode 7c are equal, so that the capacitances of the four capacitors $C_1$, $C_2$, $C_3$, and $C_4$ are all equal. Thus, the detecting section determines that the first operating member 7 is not being moved.

At this time, in the detecting section, a vertical detecting means capable of detecting a movement of the first operating member 7 in a vertical direction in the drawing compares a capacitance of $C_1+C_2$ and a capacitance of $C_3+C_4$, and a horizontal detecting means capable of detecting a movement of the first operating member 7 in a horizontal direction in the drawing compares a capacitance of $C_1+C_4$ and a capacitance of $C_2+C_3$. The comparison results of the capacitances indicate the same capacitance values, so that the detecting section can determine that the first operating member 7 is located in the initial position.

Figure 7A:
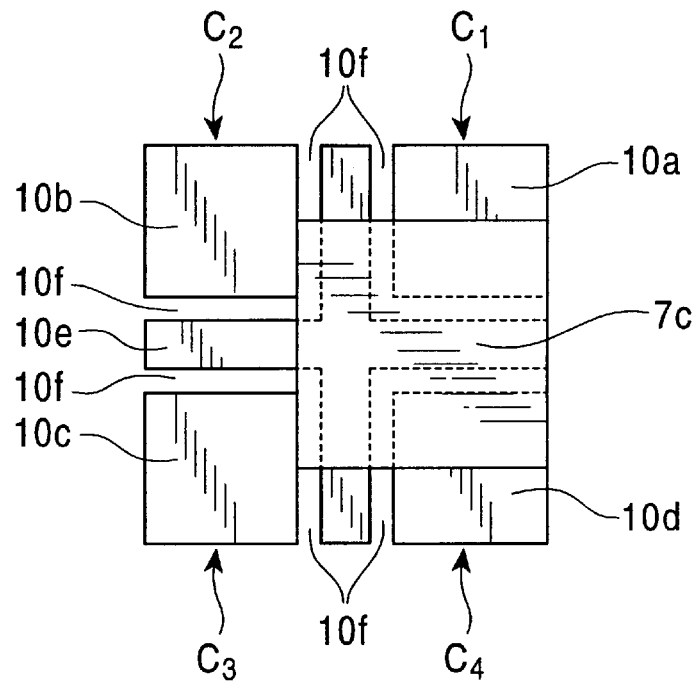
FIG. 7A is a schematic diagram showing an operating member when it has been moved to a rightmost position.

The horizontal movement of the first operating member 7 can be detected by the horizontal detecting means that compares the capacitance of the capacitors $C_1+C_4$ and the capacitance of the capacitors $C_2+C_3$. For instance, as shown in FIG. 7A, when the first operating member 7 is moved to a rightmost point, the capacitance of $C_1+C_4$ reaches a maximum value, which is indicated by Cmax, while the capacitance of $C_2+C_3$ reaches a minimum value, which is indicated by Cmin. This enables the detecting section (not shown) to determine that the first operating member 7 has been moved to the rightmost point.

Furthermore, the movement of the first operating member 7 in a vertical direction in the drawing is detected by a vertical detecting means that compares the capacitances of the capacitors $C_1+C_2$ and the capacitance of the capacitors $C_3+C_4$. For example, as shown in FIG. 7A, if the first operating member 7 has moved to the rightmost point with no vertical movement, then the capacitance of $C_1+C_2$ and the capacitance of $C_3+C_4$ are equal, making it possible to determine that the first operating member 7 has not made any vertical movement.

Figure 7B:
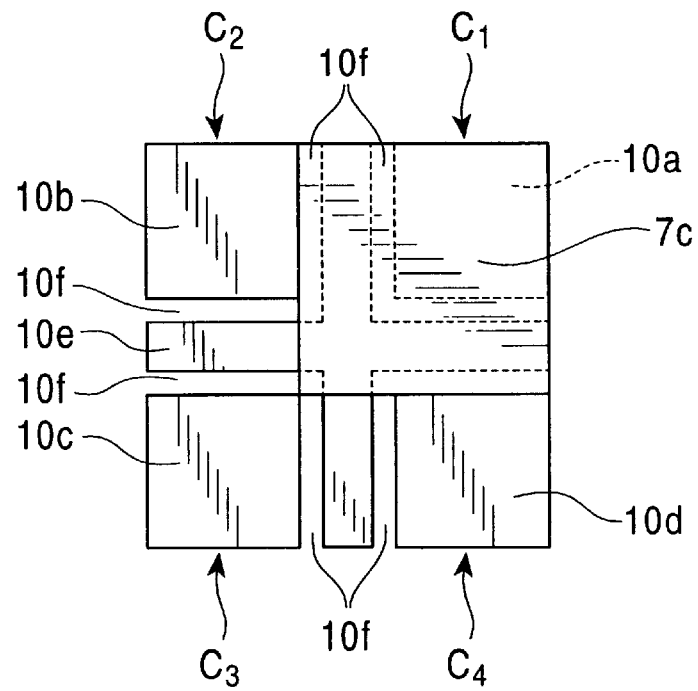
FIG. 7B is a schematic diagram showing the operating member when it has been moved to top right.

As shown in FIG. 7B, if the first operating member 7 is moved fully to top right, then the capacitance of $C_1+C_4$ reaches the maximum value Cmax, while the capacitance of $C_2+C_3$ reaches the minimum value Cmin. Thus, the horizontal detecting means determines that the first operating member 7 has moved to the rightmost point.

In this case, the capacitance of $C_1+C_2$ reaches the maximum value Cmax, while $C_3+C_4$ reaches the minimum value Cmin. Thus, the vertical detecting means determines that the first operating member 7 has moved to the topmost point.

As described above, the horizontal detecting means and the vertical detecting means of the detecting section enable the detecting section to determine that the first operating member 7 has moved to the top right point as shown in FIG. 7B.

Thus, based on the moving direction and the moving amount of the first operating member 7 that have been detected by the detecting section, a control signal is generated by a signal generating means. The moving direction and the moving amount of at least the cursor, which is the operation object and displayed on the image display section 4 of the personal computer P (the electronic equipment according to the present invention) can be controlled by the control signal.

The second operating member 8 shown in FIG. 3 has the same configuration as that of the first operating member 7, and is able to detect the moving direction and the moving amount according to the same principle. Therefore, each of the pair of first and second operating members 7 and 8 can be independently moved in the surface direction of the cover member 3.

Thus, for example, the first operating member 7 is operated to control the moving direction and the moving amount of the cursor, which is an operation object displayed on the image display section 4, while the second operating member 8 is operated to control the scroll function for moving the document, which is an operation object displayed on the image display section 4, vertically or horizontally.

In the electronic equipment in accordance with the present invention set forth above, the input device 5 is installed in the vicinity of the image display section 4. The input device 5 is provided with the pair of the first and second operating members 7 and 8 that are exposed on the inner surface 3a and the outer surface 3b, respectively, of the cover member 3.

The electronic equipment allows an operator to operate the first operating member 7 independently by using his or her thumb, and to operate the second operating member 8 independently by using at least his or her forefinger.

Moreover, the pair of the first and second operating members 7 and 8 is adapted so that, for example, the first operating member 7, which is one of the operating members, is operated to control the movement of at least a cursor, which is an operation object, and the second operating member 8, which is the other operating member, is operated to control the scroll function for scrolling at least a document, which is an operation object. Hence, for example, the personal computer 1, which is the electronic equipment in accordance with the present invention, is able to efficiently operate an operation object displayed on the image display section 4, featuring outstanding operability.

Furthermore, the input device 5 employed with the electronic equipment according to the present invention is of a capacitance type, allowing the capacitance to be increased by reducing an air gap between the movable electrode 7c and the fixed electrode 10. Therefore, a large, highly accurate movement of at least a cursor, which is an operation object, can be achieved despite a small moving amount of an operating member.

Moreover, by reducing the gap between the movable electrode 7c and the fixed electrode 10, the input device 5 can be made thinner, so that the electronic equipment in accordance with the present invention can be made thinner.

In the common electrode 10e, which equidistantly separates the four individual electrodes 10a through 10d, the capacitance of $C_c$, remains unchanged even when the first operating member 7 moves. This obviates the need of wiring of the movable electrodes 7c and 8c of the first and second operating members 7 and 8, respectively, simplifying the structure of the input device 5. As a result, the electronic equipment employing the input device 5 can minimize complicated wiring or the like, making it possible to provide electronic equipment featuring outstanding assemblability.

In the description of the embodiment of the electronic equipment in accordance with the present invention, the movable electrodes 7c and 8c of the first and second operating members 7 and 8, respectively, are rectangular. Alternatively, the movable electrodes 7c and 8c of the first and second operating members 7 and 8, respectively, may have circular configurations.

Likewise, the description has been given of the case where the fixed electrode 10 formed on the fixed member 9 is divided into the plural individual electrodes 10a through 10d. Alternatively, the movable electrodes 7c and 8c of the first and second operating members 7 and 8, respectively, may be divided into plural electrodes.

In other words, either the movable electrode or the fixed electrode may be divided into plural electrodes to form the individual electrodes.

Thus, in the electronic equipment according to the present invention, the input device installed in the vicinity of the image display section of the cover member has the pair of operating members that are exposed on the inner surface and the outer surface of the cover member, each of the pair of operating members being able to be moved independently within a predetermined range in the surface direction of the cover member. The moving direction and the moving amount of each of the pair of operating members are detected, and based on the detected moving direction and moving amount, the moving direction and the moving amount of an operation object displayed on the image display section are controlled. Hence, an operator can independently move each of the pair of operating members of the input device by using, for example, the thumb and the forefinger of his or her right hand. Thus, electronic equipment featuring outstanding operability can be provided.

The plural capacitors are formed between the individual electrodes and the movable electrode, and the detecting section detects the moving direction and the moving amount of each of the paired operating members based on the changes in the capacitances of the plural capacitors, the changes being caused by the movement of each of the paired operating members. Therefore, the moving direction and the moving amount of an operation object can be controlled by moving the operating members in the surface direction of the cover member, so that the input device can be made thinner and the electronic equipment incorporating the input device can be made thinner accordingly.

The fixed electrodes are formed on both surfaces of the fixed member sandwiched by the pair of operating members, and the fixed electrodes are divided into the plural electrodes to form the individual electrodes. This arrangement obviates the need for drawing out wires from the movable electrode of the movable operating member. The detection of changes in the capacitances of the capacitors can be accomplished simply by drawing out the wires from the individual electrodes of the fixed electrodes. This arrangement makes it possible to provide electronic equipment having a simple configuration with less wires, meaning easier assembly.

The pair of operating members is adapted so that one of the operating members is operated to control the movement of at least a cursor, which is an operation object displayed on the image display section, and the other operating member is operated to control the scroll function for scrolling at least a document, which is an operation object displayed on the image display section. With this arrangement, at least the movement of the cursor and the scrolling of the document can be performed by the single input device, thus enabling electronic equipment with outstanding operability to be provided.

The paired operating members are supported at their initial positions by the reset springs in the non-operation mode, and automatically reset to the initial positions after completion of operation. Hence, the operating members can be automatically reset to the initial positions as soon as fingers are released from the input device upon completion of operation, permitting greater ease of operation.

As the moving amounts of the operating members increase, the force applied to the operating members must be increased to overcome an elastic force of the reset springs. This arrangement allows the operator to feel the increased operating load, making it possible to provide electronic equipment that features outstanding operability and responsiveness.

What is claimed is:

1. Electronic equipment comprising:
   a cabinet in which a keyboard input device comprised of a plurality of key switches is installed;
   a cover member attached to the cabinet and which is capable of opening and closing a top of the cabinet;
   an image display section provided on an inner surface of the cover member facing against the keyboard input device when the cover member closes the top of the cabinet; and
   an input device provided on the cover member in the vicinity of the image display section,
      wherein the input device has a pair of operating members exposed on an inner surface and an outer surface, respectively, of the cover member;

each of the pair of operating members can be independently moved within a predetermined range in a surface direction of the cover member;

a moving direction and a moving amount of each of the operating members are detected; and a moving direction and a moving amount of an operation object displayed on the image display section are controlled based on the detected moving direction and moving amount of each of the operating members.

2. Electronic equipment according to claim 1, wherein the input device has a movable electrode provided on each of the pair of operating members, and a fixed electrode provided at a position opposing the movable electrode;

either the movable electrode or the fixed electrode is divided into a plurality of electrodes to form individual electrodes so as to form a plurality of capacitors between the individual electrodes and the movable electrode, thereby providing a detecting section for detecting a moving direction and a moving amount of each of the pair of operating members based on changes in capacitances of the plural capacitors caused by a movement of each of the pair of operating members.

3. Electronic equipment according to claim 2, wherein the fixed electrodes are formed on both surfaces of a fixed member held between the pair of operating members, and each of the fixed electrodes is divided into a plurality of electrodes to form the individual electrodes.

4. Electronic equipment according to claim 1, wherein the pair of operating members is configured so that a movement of at least a cursor, which is an operation object displayed on the image display section, is controlled by operating one of the pair of operating members, and a scroll function for scrolling at least a document, which is an operation object displayed on the image display section, is controlled by operating the other of the pair of operating members.

5. Electronic equipment according to claim 1, wherein the pair of operating members is configured so that it is supported in an initial position by a reset spring in a non-operation mode, and automatically reset to the initial position after completion of an operation.

* * * * *